(12) United States Patent
Li et al.

(10) Patent No.: US 6,377,732 B1
(45) Date of Patent: Apr. 23, 2002

(54) PLANAR WAVEGUIDE DEVICES AND FIBER ATTACHMENT

(75) Inventors: Cheng-Chung Li, Painted Post, NY (US); Fan Qian, Harrisburg, PA (US); Robert A. Boudreau; John R. Rowlette, Sr., both of Hummelstown, PA (US); Terry P. Bowen, Etters, PA (US)

(73) Assignee: The Whitaker Corporation, Wilmington, DE (US)

( * ) Notice: Subject to any disclaimer, the term of this patent is extended or adjusted under 35 U.S.C. 154(b) by 0 days.

(21) Appl. No.: 09/489,050

(22) Filed: Jan. 21, 2000

Related U.S. Application Data
(60) Provisional application No. 60/116,896, filed on Jan. 22, 1999.

(51) Int. Cl.[7] .................................................. G02B 6/30
(52) U.S. Cl. .............................. 385/49; 385/50; 385/51; 385/52
(58) Field of Search ............................ 385/49, 50–52, 385/65, 83

(56) References Cited

U.S. PATENT DOCUMENTS

| | | | |
|---|---|---|---|
| 4,619,680 A | * 10/1986 | Nourshargh et al. | 65/3.12 |
| 4,759,595 A | 7/1988 | Boord et al. | 350/96 |
| 4,948,219 A | 8/1990 | Seino et al. | 350/96 |
| 4,966,433 A | 10/1990 | Blonder | 350/96 |
| 5,071,215 A | 12/1991 | Hockaday | 385/49 |
| 5,073,002 A | 12/1991 | Hockaday | 385/49 |
| 5,175,778 A | 12/1992 | Nourshargh et al. | 385/42 |
| 5,231,683 A | * 7/1993 | Hockaday et al. | 385/49 |
| 5,319,729 A | 6/1994 | Allen et al. | 385/90 |
| 5,357,593 A | 10/1994 | Bossler | 385/49 |
| 5,444,805 A | 8/1995 | Mayer | 385/49 |
| 5,471,552 A | 11/1995 | Wuu et al. | 385/49 |
| 5,483,613 A | 1/1996 | Bruce et al. | 385/129 |
| 5,518,965 A | 5/1996 | Menigaux | 437/228 |
| 5,737,138 A | * 4/1998 | Someno | 359/900 |
| 5,784,509 A | * 7/1998 | Yamane et al. | 385/49 |
| 5,787,214 A | 7/1998 | Harpin et al. | 385/49 |
| 5,827,342 A | 10/1998 | Jean Beguin et al. | 65/60 |
| 5,853,960 A | 12/1998 | Tran et al. | 430/321 |
| 5,882,468 A | 3/1999 | Crockett et al. | 156/345 |
| 5,905,831 A | 5/1999 | Boudreau et al. | 385/88 |
| 6,212,320 B1 | * 4/2001 | Rickman et al. | 385/49 |
| 6,233,388 B1 | * 5/2001 | Kim et al. | 385/143 |

FOREIGN PATENT DOCUMENTS

| | | | |
|---|---|---|---|
| EP | 09938013 | 8/1999 | |
| WO | 9923514 | 5/1999 | G02B/5/04 |

* cited by examiner

*Primary Examiner*—Hemang Sanghavi
*Assistant Examiner*—Scott Knauss

(57) ABSTRACT

According to the present invention, an optical waveguide is provided on a silica or silicon substrate using MPACVD and ICP etching processes. Optical fiber is coupled to the waveguide by positioning the fiber in a groove formed in the waveguide and compressing a top lid on the fiber. The top lid is secured to the waveguide and fiber by an epoxy or a solder. In a solder based embodiment, the cladding of the fiber may have a metallization evaporated thereon.

10 Claims, 3 Drawing Sheets

PLANAR WAVEGUIDE DEVICES AND FIBER ATTACHMENT

CROSS-REFERENCE TO RELATED APPLICATIONS

The present application claims the benefit of U.S. Provisional Application Ser. No. 60/116,896, filed Jan. 22, 1999, the teachings of which are incorporated herein by reference.

FIELD OF THE INVENTION

The present invention relates to optical devices, and, more particularly, to a planar waveguide device formed on a substrate and a fiber attachment for the same.

BACKGROUND OF THE INVENTION

Optical communication systems require different functional components for high efficiency and network flexibility. Optical circuits based on low-loss glass waveguide are the practical and promising approaches to integrate both active and passive devices as a single module for fiber interconnection. Various deposition methods have been developed to deposit the thick glass layer for the application of integrated optics. Those technologies include: (1) thermal oxidation, (2) sputtering, (3) microwave plasma assisted chemical vapor deposition (MPACVD), (4) plasma-enhanced chemical vapor deposition (PECVD), (5) low pressure chemical vapor deposition (LPCVD), (6) flame hydrolysis deposition (FHD) and (7) sol-gel deposition (SGD).

Of the above-described methods, it has been found that Microwave Plasma Assisted Chemical Vapor Deposition (MCPACVD) is particularly advantageous. MPACVD is described for example in U.S. Pat. No. 4,619,680, the teachings of which are incorporated herein by reference. MPACVD is cost efficient and compatible with Si-based microelectronics. Low loss coupling with a single-mode optical fiber can be achieved cheaply with either passive alignment or active alignment. A wide range of low-loss passive components may be produced on a large wafer. Furthermore, hybrid integration techniques allow additional light sources or active components integrated on the same substrate.

SUMMARY OF THE INVENTION

Microwave Plasma Assisted Chemical Vapor Deposition (MPACVD) produces superior quality, low birefringence, low-loss, planar waveguides for integrated optical devices. Microwave plasma initiates the chemical vapor of $SiCl_4$, $GeCl_4$ and oxygen. A Ge-doped silica layer is deposited on a silica or silicon substrate with reasonable high growth rate (e.g. 0.4–0.5 μm/min). The resulted refractive index can be varied between 1.46 (i.e. pure silica) to 1.60 (i.e. pure germania). Waveguides can be fabricated with any desired refractive index profile. Standard photolithography defines the waveguide pattern on a mask layer. The core layer is removed by plasma dry etch, preferably an inductively coupled plasma (ICP) etch. Etch rates of 3000–4000 Å/min have been achieved using ICP compared to a typical etch rates of 200–300 Å/min using conventional RIE. A polished fiber end can be epoxied or soldered to the end facet of a waveguide with a very low optical coupling loss. In addition, etching of silicon V-grooves or U-grooves provides a passive fiber alignment capability.

BRIEF DESCRIPTION OF THE DRAWING

Advantages of the present invention will be apparent from the following detailed description of the invention, which description should be drawings in which.

DETAILED DESCRIPTION

Consistent with the present invention, an optical device is preferably formed using MPACVD on a silica or silicon substrate. Although MPACVD provides significant advantages over other methods, other methods may be used. It is to be understood, therefore, that although the present invention will be described herein in connection with MPACVD, it is not limited to MPACVD.

Figure 1A:
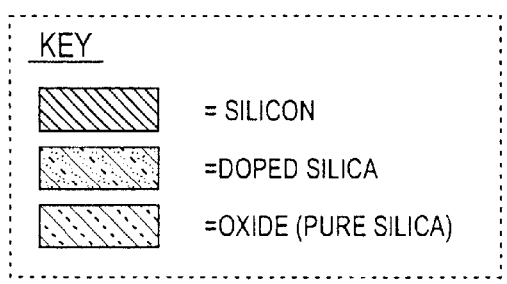
FIGS. 1(a) to 1(f) show diagrammatically steps taken in one method consistent with the invention.
Figure 1A:
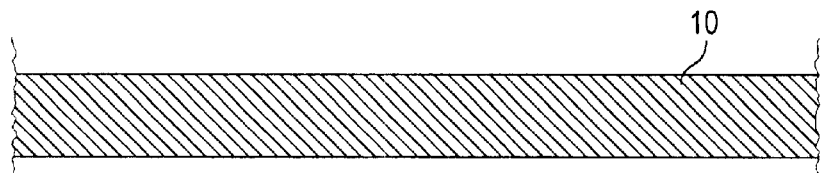
Figure 1B:
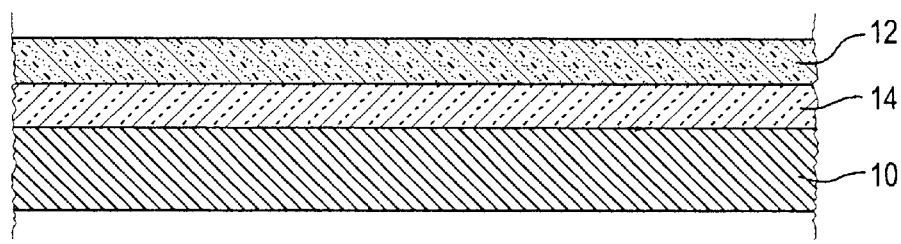
Figure 1C:
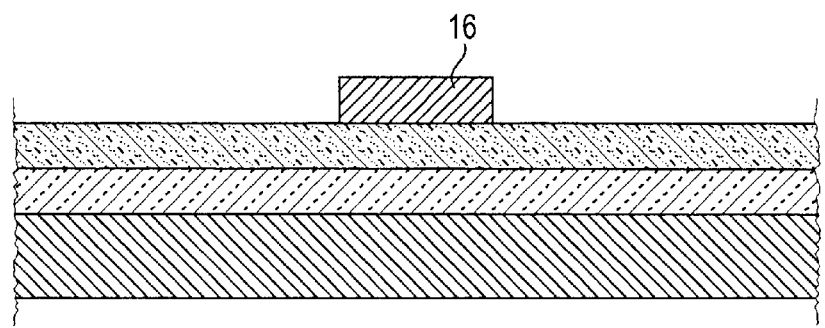
Figure 1D:
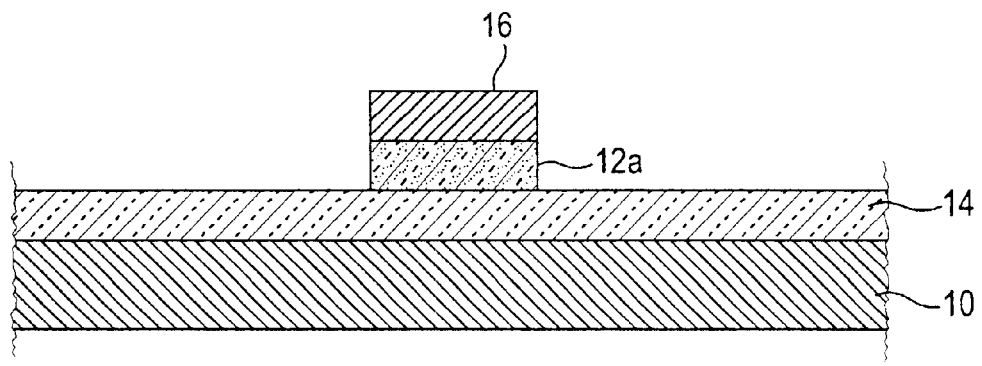
Figure 1E:
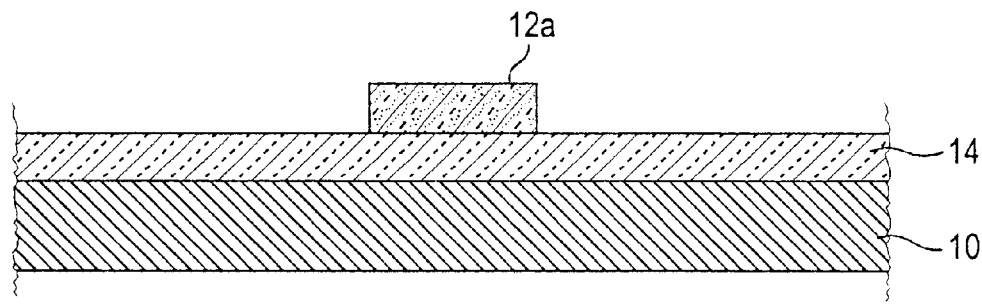
Figure 1F:
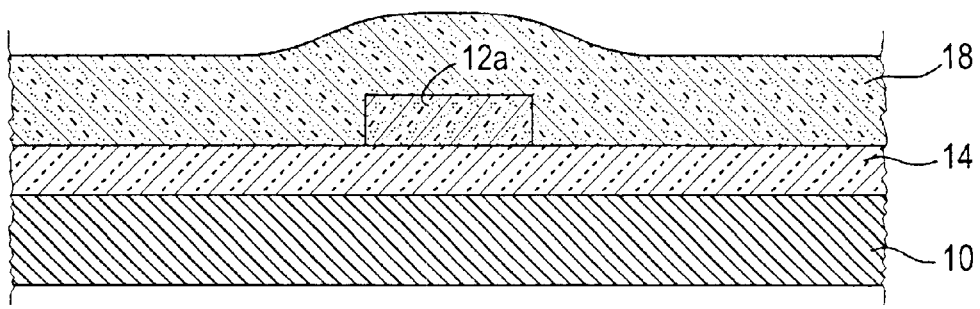

Turning now to FIGS. 1(a) through 1(f), there is shown the steps taken in an exemplary method for making a waveguide structure consistent with the invention. As shown in FIG. 1(a), a substrate 10 for the waveguide structure is provided. In the illustrated embodiment, the substrate comprises silicon. It is to be understood, however, that the process described herein is equally applicable to a substrate formed from silica. A silica substrate can be used to achieve advantageous thermal matching characteristics in the waveguide structure. A silicon substrate, on the other hand, allows for more efficient heat transfer. As shown in FIG. 1(b), a high index waveguide core 12 is deposited on an oxidized layer 14 on the silicon substrate 10 and is deposited by MPACVD techniques. In the case where a silica substrate is used, the core layer 12 may be deposited directly on the silica substrate. Standard photolithography is used to define the waveguide pattern using a mask layer 16, as shown in FIG. 1(c). As shown in FIG. 1(d), the core layer is removed by plasma dry etch, preferably inductively coupled plasma (ICP) etch, leaving only portions 12a of the core layer under the mask layer 16. Advantageously, ICP etching allows for high etching rates and provided uniformity of an etched plane in vertical profile in etched surfaces. Reactive ion etching (RIE) may also be used at the sacrifice of high etching rates, deep etching capabilities, and vertical etching profiles provided by ICP etching. As shown in FIG. 1(e), the mask layer is removed, and a silica cladding layer 18 is deposited on the entire structure.

For example, in one embodiment consistent with the invention using a silicon substrate, a 10–20 μm thickness under-cladding layer 14 is required to separate the optical mode from the silicon substrate 10. A core layer 14 of Ge doped silica with an index difference (Δn) of 0.25%–0.75% is then deposited using MPACVD. The dopant level is designed to match the optical mode of a standard single mode fiber. Thickness and width of the core layer 14 are in the range of 6–8 μm for a single mode operation. After the patterning process, a thick overcladding layer 18 is used to bury the waveguide core 12a. This adds symmetry to the waveguide structure and isolates the mode field from its surroundings.

In an exemplary MPACVD system for depositing a waveguide consistent with the invention, a barrel furnace contains a plasma reaction zone above the substrate. The 4-inch diameter substrate, for example, is held on a rotating stage. The required low pressure (0.4–0.7 Torr) is controlled by a vacuum pump. Chemical vapor of $SiCl_4$ and $GeCl_4$ are carried by argon flow of 25–80 sccm into the chamber. Oxygen and argon are also fed into the argon plasma region, which is excited by a microwave generator (≈1900 W Max. at 2.45 Ghz). The plasma initiates the following reactions:

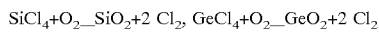

Thus, using MPACVD a Ge-doped silica layer is deposited on the substrate with relatively high growth rate compared to that of typical CVD As noted above, ICP etching provides advantages over conventional RIE etching in an illustrative example, a Ge-doped silica layer was etched in reactive ion etch (RIE) using a gas mixture of $CHF_3$ and $O_2$. The oxygen was maintained in the range of 5–10%, which is sufficiently high to minimize polymer formation during etching. The chamber pressure was held at 70 m Torr and a RF power level of 400 W was used. The developed dc bias was approximately 450 V under these conditions. High-density plasma sources, like ICP, allow significant improvement in the definition of the high aspect ratio features.

The same gas mixture was used for the ICP but a lower chamber pressure was used. The RF power levels of both the ICP (2 MHz) and electrode bias (12.56 MHz) were varied. Etch rates of 3000 Å/ min were achieved by using ICP compared to typical etch rate of 400 Å/min by using conventional RIE. A major difference between the ICP and RIE modes is in the magnitude of the developed dc bias. In RIE mode the bias increases as the RF power is increased, in the ICP mode the bias decreased as the ICP power is increased, due to the increasing plasma density.

Advantageously, the ICP operation of high power density and low dc bias levels allows metal mask (e.g. Cr, Al mask) to be used with selectivity >50:1 for silica etching. For further reducing of scattering loss due to surface roughness, the core may be reflowed to form a cylindrical-like cross-section. However, upon reflow of the upper-cladding layer deposited, the optical scattering core surface may also be improved by merging the core with cladding oxide at high temperature.

In a structure consistent with the invention, the propagation losses may be very low, i.e. <0.1 dB/cm. The main advantage of the low loss aspect in MPACVD is that no hydrogen is involved in the fabrication process. The presence of hydrogen in other CVD technology produce an absorption primarily near 1.39 μm and 1.52 μm, which correspond to the $2^{nd}$ harmonic of stretching vibrations of O-H bonds, and $3^{rd}$ harmonic of SiH bonds, although this can be reduced by thermal annealing.

The MPACVD process produces a one-sided deposition of thick silica film. A bowed SI wafer (515 μm thick) was observed implying that the film was stressed. Films under stress often relieve their stress by cracking. Cracking occurs when a critical film thickness or critical temperature is exceeded. Increasing crack resistance (CR) will improve the film. Crack resistance is defined as:

$$CR = (p/p_o)\sigma_u - \sigma_f - E/(1-v') \int_T^{Ts} \Delta\alpha dT$$

where, p: density of deposited film $p_o$: density of "perfect" film $\sigma_u$: ultimate tensile stress (UTS) of a structure perfect film $\sigma_f$: intrinsic film stress $\Delta\alpha$: the difference of thermal[-] expansion coefficient of film and substrate E: Young's modulus v': Poission's ratio T: test temperature $T_s$: substrate temperature at deposition According to the equation, CR can be increased if (a) the film density p is increased, (b) the intrinsic film stress of $\sigma_f$ is made small, i.e. low tensile, or compressive stress which is strongly related to process parameters, (c) $\Delta\alpha$ is made small, i.e. the match between the thermal-expansion coefficient of the film and of the substrate is improved, and (d) the substrate deposition temperature is made high relative to the test temperature.

The film density may be an indicator of the effective strength of the film. The factors which decrease the film density (chemical and/or structural) can produce submicroscopic surface flaws which will act as stress magnifiers and aid the logs of mechanical integrity upon application of the stress. In the MPACVD system the energy and density of ion bombardment during deposition largely determine the film density. Ion bombardment density is controlled via microwave power level and the position of the substrate. Higher power levels increase plasma density, thus resulting in greater ion bombardment density and more compressive films, which are generally more structurally stable. Properly selected pressures will result in high kinetic energy of ions. For example, the gas density varies with pressure, and the mean free path is longer at lower pressure. Since the sheath thickness and sheath potential are less influenced by pressure the electric field in the sheath is relatively unaffected. The ions accelerated towards the substrate at low pressure can gain more energy before a collision takes place. The effect of ion bombardment will be more pronounced at lower pressures. Reactor pressure, substrate temperature, and gas flows also affect stress. However, these variables are used to establish film properties such as uniformity, and deposition rate, rather than being used to control stress.

Substrate thickness and surface condition also affect the stress of deposited films. Shear stress can act at 45° to the primary flat direction, causing crack lines oriented parallel and orthogonal to the primary flat. Thicker substrates (e.g. 1 mm thick Si wafer) are thus preferred to prevent shear cracking since the substrate deformation is reduced during high temperature process. Most of the polished surfaces of the substrates (i.e. quartz substrate) have a certain amount of residual stress introduced by the polishing process. It has been found that this can be suppressed by annealing at the high temperature of their transformation range, or removed by shallow surface etch. At the initial growth stage, lower growth rate may be used to produce dense film, and good adhesion with the substrate. Thus, the cracking problem can be improved.

Low loss coupling between a planar waveguide and SM fiber, because of the good optical mode matching offered by the waveguide, can be readily achieved via a passive alignment technique, in which a fiber is butted against a waveguide end facet and secured along a precision micromachined V-groove or U-groove, respectively, on silicon and silica substrates. Anistropic wet etching of the single crystal Si planes is used to create V-grooves, and U-grooves can be fabricated on silica substrate via an isotropic dry etching process.

Advantageously the V grooves or U-grooves may be defined by the same masking step used to define the waveguide cores. Also, etching is preferably by an ICP process to achieve sufficiently deep grooves for aligning a fiber core with the waveguide. ICP etching also establishes a smooth and vertical facet on the waveguide which facilitates low-loss coupling to the fiber. Thus, although other etching techniques may be used, ICP etching is preferred.

Figure 2:
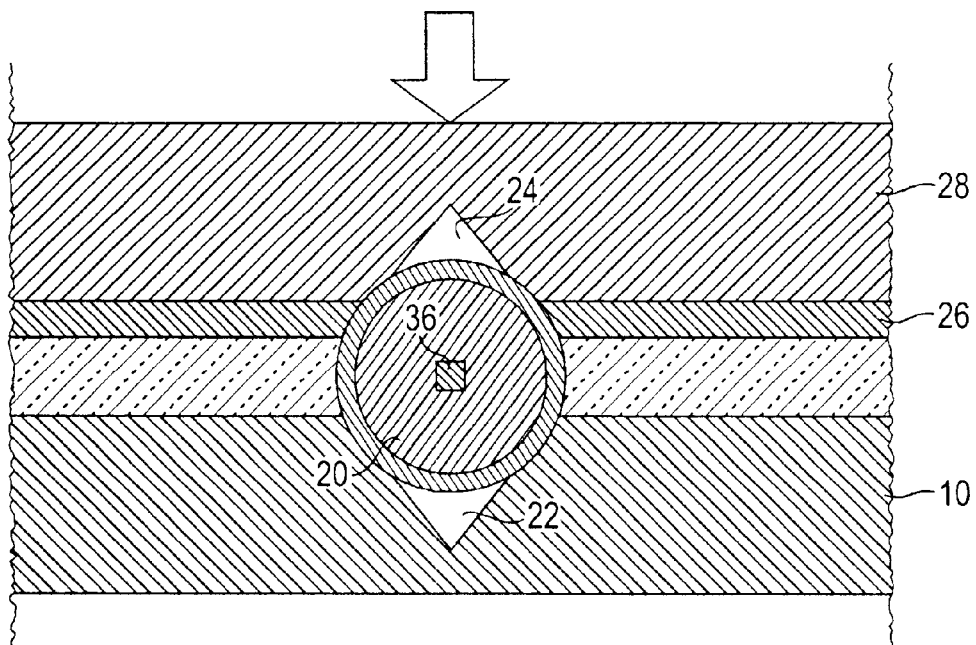
FIG. 2 illustrates an epoxy fiber-waveguide coupling arrangement consistent with the invention.

According to one method of fiber-waveguide pigtailing consistent with the invention, as shown in FIG. 2, SM fiber 20, e.g. is a 9/125 µm fiber, guided and sandwiched with opposed V-grooves 22, 24 precision etched in both the SI substrate 10 and a top capping lid 28, e.g. formed from silicon or other thermally conductive material. Epoxy 26 is then wicked in between the top 28 and bottom pieces and UV or thermally cured.

Figure 3:
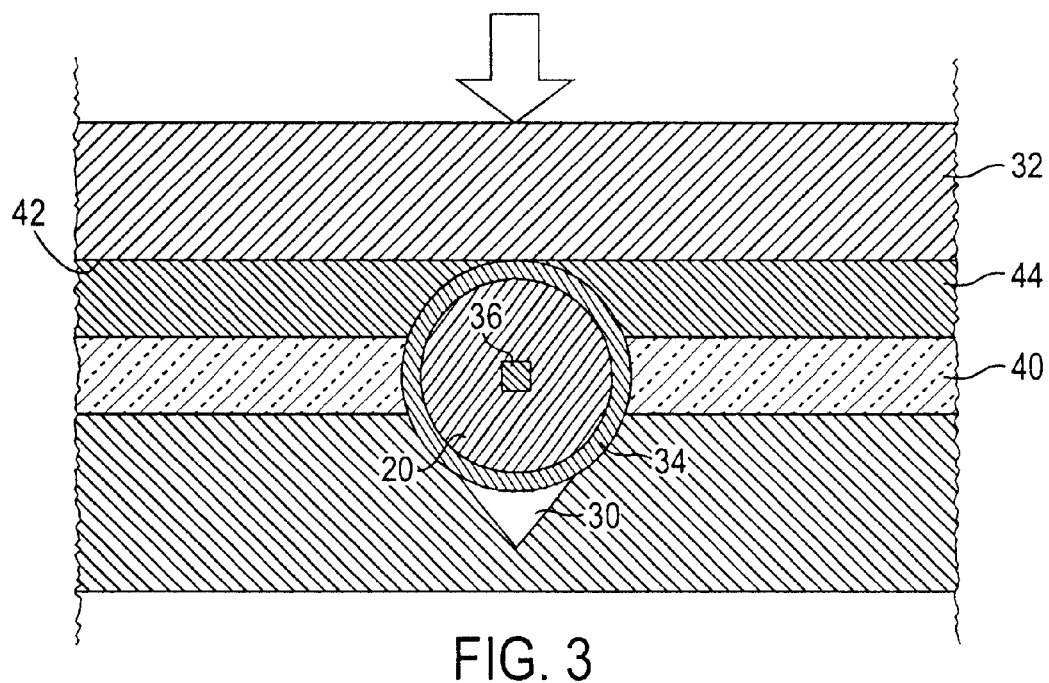
FIG. 3 illustrates an exemplary solder fiber-waveguide coupling arrangement consistent with the invention.

According to an alternative, solder-based technique, as shown in FIG. 3, for example, the fiber 20 is similarly positioned in a V groove 30 by a top lid 32. But instead of being bare, the fiber cladding surface is metalized by evaporated Cr/Ni/Au, coating 34. The coating is relatively thin, e.g. 10 microns, and is accounted for in considering the depth of the groove 30 to facilitate alignment of the fiber core 36 with the waveguide core.

By soldering the lid-fiber substrate together, a robust, metal based fiber bond is created. To achieve sufficient solder reflow, the top lid material is heated to a temperature above the solder melting point, being a good thermal conductor, it transfers the heat and briskly reflows the solder material in between itself and the fiber /substrate. Solder pads (Ti/Ni/Au) are lithographically patterned on the silica surface 40 and /or bottom surface 42, of the top lid for solder wetting. Depending on the specific packaging requirements, the solder materials used include PbSn, AuSn, or other solders having appropriate properties. The solders can be of performs or electrolytically plated layers. The solder reflow process takes no more than a couple of seconds, and the placement of fiber and top lid is carried out by a modified die bonder. This process, with its much shorter cycle time and good long term bonding stability could offer a better performance/cost combination than the epoxy based fiber pigtailing technique.

While the foregoing invention has been described in terms of the embodiments discussed above, numerous variations are possible. Accordingly, modifications and changes such as those suggested above, but not limited thereto, are considered to be within the scope of the following claims.

We claim:

1. A method of coupling an optical fiber to a waveguide comprising:

forming an end facet on said waveguide using ICP etching techniques;

providing an optical fiber;

providing a metallization on an outer cladding surface of said fiber;

Positioning said fiber in said groove;

providing a top lid over said fiber in said waveguide with a solder material disposed between said top lid and waveguide;

compressing said top lid onto said fiber;

heating said top lid to cause reflow of said solder and adhere said top lid to said waveguide and securely capture said fiber in said V-groove with a core of said fiber in alignment with said waveguide.

2. A method according to claim 1, wherein said top lid comprises a thermally conductive material.

3. A method according to claim 1, wherein said top lid comprises silicon.

4. A method according to claim 1, wherein said waveguide comprises a silica layer deposited on a substrate.

5. A method according to claim 4, wherein said substrate is a silica substrate.

6. A method according to claim 1, wherein said groove is a V-groove.

7. A method according to claim 4, wherein said substrate is a silicon substrate.

8. A method according to claim 1, wherein said end facet is substantially vertical in wherein said fiber is positioned in the inside groove with an end of said fiber in contact with said end facet.

9. A method according to claim 1, wherein said top lid is heated using a localized laser heat source.

10. A method of coupling an optical fiber to a waveguide comprising:

forming an end facet on said waveguide using ICP etching techniques;

positioning said fiber in a groove formed in said waveguide with a core of said fiber in alignment with a core of said waveguide;

providing a top lid having a groove therein;

positioning said top lid over said fiber with said fiber disposed in said groove and said top lid;

inserting epoxy between said top lid and said waveguide for securing said top lid to said waveguide in said fiber.

* * * * *